May 5, 1953 — H. J. STEGEMAN — 2,637,157
GAUGE ROLL FOR LAWN MOWERS
Filed Jan. 29, 1951 — 2 SHEETS—SHEET 1

INVENTOR.
HENRY J. STEGEMAN
BY John J. Hanrahan
ATTORNEY

May 5, 1953  H. J. STEGEMAN  2,637,157
GAUGE ROLL FOR LAWN MOWERS
Filed Jan. 29, 1951                                          2 SHEETS—SHEET 2
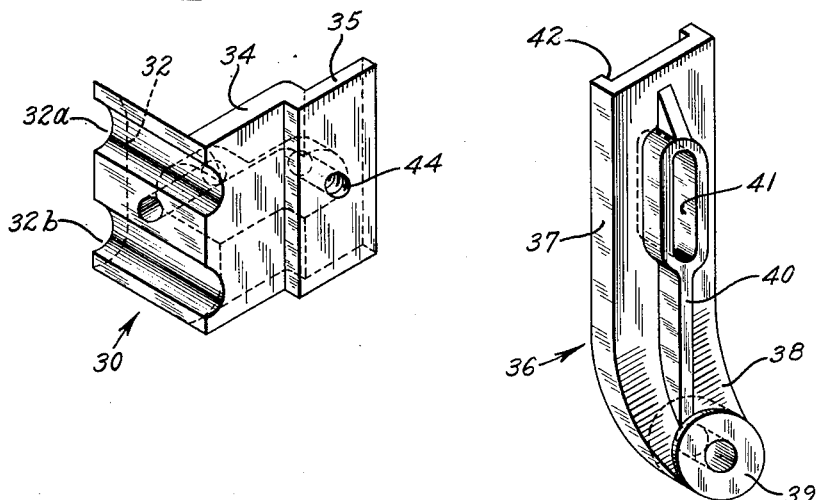
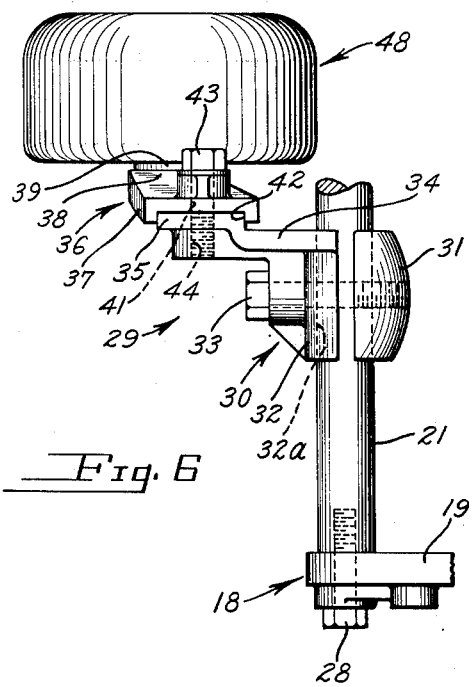
INVENTOR.
HENRY J. STEGEMAN
BY
ATTORNEY Patented May 5, 1953

2,637,157

UNITED STATES PATENT OFFICE 2,637,157

GAUGE ROLL FOR LAWN MOWERS

Henry J. Stegeman, Fairfield, Conn., assignor to The Locke Steel Chain Company, Bridgeport, Conn., a corporation of Connecticut Application January 29, 1951, Serial No. 208,388

3 Claims. (Cl. 56—249)

This invention relates to new and useful improvements in lawn mowers and has particular relation to an auxiliary gage roll for the cutter unit of the lawn mower.

An object of the invention is to provide a gage roll and mounting therefor especially adapted for application to the cutter unit of a power lawn mower of the type including a cutter unit located in advance of the power unit and connected with the latter in such manner as to be capable of an up and down movement relative thereto.

Another object is to provide a gage roll and mounting including means whereby the roll may be located at various heights relative to the cutter reel of the cutter unit and also may be located closer to or farther from the cutter reel.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 4 is an enlarged isometric view of a portion of the mounting bracket employed;

Fig. 5 is a similar view of the post element of the present gage roll mounting; and Fig. 6 is a view similar to Fig. 2 but with the bracket part and post reversedly mounted on the cutter unit to locate the gage roll farther in advance of the cutter reel.

Figure 1:
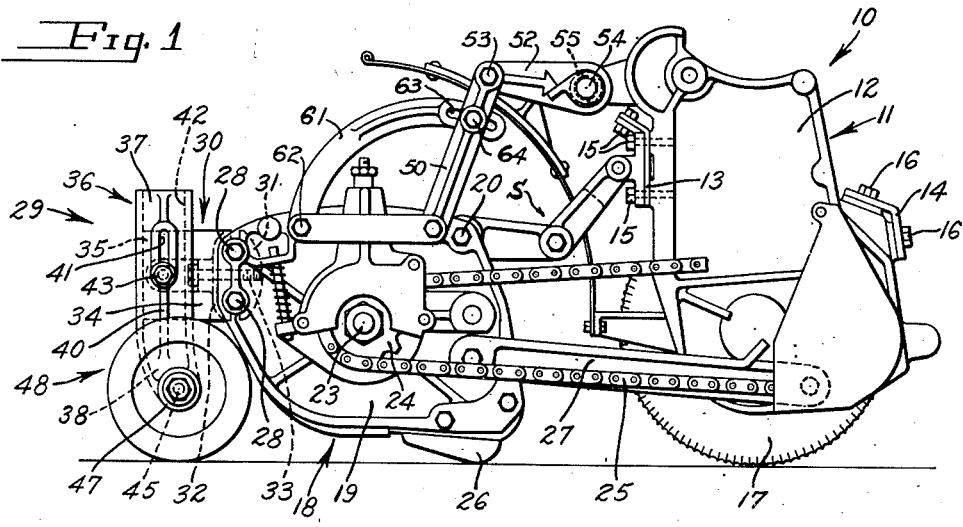
Fig. 1 is an enlarged side elevational view of a portion of a power lawn mower having attached to its cutter unit the gage roll and mounting of the invention.

Referring in detail to the drawings, at 10 is generally indicated a portion of a power lawn mower, which lawn mower is generally that specifically disclosed in the patent to Locke and Stegeman, No. 1,886,408 issued November 8, 1932. Lawn mower 10 includes a main frame generally designated 11 and comprising a pair of like end members of which one is shown at 12 and cross or connecting members 13 and 14 secured as by bolts 15 and 16, respectively, to said end members. Main frame 11 is supported by ground engaging rolls 17 driven from a motor (not shown).

Forwardly of main frame 11 is a cutter frame generally designated 18 and comprising end members of which but one 19, is shown and a rear bar 20 and a pair of front bars 21 and 22 connecting said end members. The bars 20, 21 and 22 are all parallel with one another and the bars 21 and 22 are also in vertical alignment or substantially so and anchored to the end members by screws 28.

The cutter frame 18, on a shaft 23, mounts a cutter reel (not shown) fixed to a sprocket 24 driven by a chain 25 from the motor of the mower. Such cutter reel cooperates with a stationary blade (not shown) associated with a ground engaging shoe 26 as fully disclosed in the above identified patent. A pair of like spacing links, of which but the one 27 is shown, are pivoted at their respective rear and forward ends to the end members of the frames 11 and 18 whereby said frames are connected to move together over a lawn but also whereby the cutter frame may have a floating up and down movement relative to the main frame. A sway control means S connects the frames 11 and 18.

The cutter frame and the rotary cutter reel carried thereby are largely supported by the main frame by connection means with each of the end members 19, one such means being shown and consisting of a link 50 and an arm 52, together with the spacing link 27 which is pivotally connected at its forward end to the side member and at its rearward end to the main frame. The link 50 has one end pivotally connected at 51 to the side member and its other end pivotally connected at 53 to the arm 52. The arm 52 is mounted on a rod 54 journaled in the main frame and a heavy coil spring 55 surrounds the rod 54 and tends to raise the cutter frame so as to counterbalance the major portion of the weight of the cutter frame and the parts carried thereby. Means are provided for adjusting the position of the shoe 26 by changing the angular position of the cutter frame with respect to its pivotal connections with the arm 52 and the spacing link 27, such means consisting of an arcuate link 61, one end of which is secured to the link 50 and the other end of which is pivotally connected at 62 with the side member 19. A slot 63 is provided in the link 61 having a bolt 64 passing therethrough, this bolt being fixed in the link 50 and adapted upon being loosened to permit adjustment of the link 61, and therefore a variation in the angular position of the cutter frame, and in the height of the shoe 26, the position of adjustment being fixed by tightening the bolt. Normally, the links 50 and 61 are in rigid relation with the cutter frame, and raising and lowering movement of the cutter frame takes place through swinging of both the counterbalance supporting arm 52 and the spacing link 27.

The present invention relates to a gage roll device generally designated 29 and mounted on the vertically aligned horizontally disposed bars 21 and 22 of the cutter frame 18. The gage roll is adjustable as will be hereinafter described and according to its vertical adjustment will determine the height at which the grass of a lawn is cut by the cutter reel in association with the stationary blade of the cutter mechanism.

The gage roll device 29 is rigid with the cutter frame and by its height adjustment it is the prime regulator or gage to control the height of the grass being cut. Due to the rigid links 50 and 61 and the support of the cutter for raising and lowering movement by the counterbalance arm 52 and the spacer link 27, the height adjustment of the gage roll device into a position to raise the cutter will raise the shoe 26 so that while the shoe is shown in ground engaging position in Fig. 1, actually it is normally adjusted out of contact with the ground so that the cutter unit is suspended between the relatively widely spaced rollers 17 of the main frame and the gage roll device 29. In other words, the gage roll does not constitute a ground supporting means for the cutter unit as it would in the absence of the gage roll device 29 and such as it does in the device disclosed in the patent to Locke and Stegeman, No. 1,886,408 above referred to, but in its place, the gage roll constitutes the ground engaging support for the cutter unit as well as the gage for determining the height of cut of the grass. Thus, the shoe 26 does not regulate the height of cut of the grass and, when moving over a level lawn, it does not ride on the ground surface. However, when the mower passes over a pronounced convex surface, the shoe 26 being lower than the cutter reel rides on the ground surface and therefore prevents scalping of the lawn. When the shoe 26 is set at the proper height, the grass on the convex mound is cut somewhat shorter than the height set by the gage device 29 but not so short as to scalp the lawn.

Gage roll device 29 includes a clamp 30 comprising an anchoring portion 31 located at the rear sides of the bars 21 and 22 and spanning them and preferably grooved or channeled at spaced points to partially embrace said bars. In addition, the clamp includes a forward portion 32 also spanning the bars 21 and 22 and grooved or channeled, as at 32a and 32b, to partially receive or embrace them. These two clamp parts 31 and 32 are clamped to and against the bars 21 and 22 by means of a screw 33 passing through the front clamp portion 32 and threaded into the rear clamp portion 31 and passing between the bars 21 and 22.

Forward clamp portion 32 includes a forwardly extending arm 34 located at one end of the clamp body and at its outer end laterally offset whereby such arm carries and, as herein shown, actually forms a guide block 35 located slightly laterally of the assembled clamp portions 31 and 32. The purpose of so locating guide 35 will later be described but here it is noted that such location is concerned with the positioning of a gage roll relative to the cutter frame.

In addition to the clamp structure thus far described the present gage roll device comprises a post generally designated 36 and including an upper vertically disposed portion 37 and a lower laterally curved end portion 38 having a hub 39 therein. A strengthening web 40 along the outer side of the post 36 has a vertical longitudinally extending slot 41 therethrough and such slot passes entirely through the post.

In its side opposite the rib 40 the post is channeled or provided with a way 42 of a width to rather snugly receive the guide means or block 35. Thus, it will be understood that the block 35 and the channel or way 42 provide complemental or cooperating means whereby the post 36 may be securely mounted on the bracket arm 34. With the post arranged in such manner that channel 42 is receiving guide block 35, a bolt 43 is passed through the slot 41 and threaded into the opening 44 of the guide block clamping the post tight against the guide block.

Clearly, relative lateral movement of the post and block or relative turning movement of these parts with the bolt 43 as a center is impossible since the edges of the channel 42 are against the edges of the block 35. However, the post may be vertically adjusted within the limits of the length of the slot 41 on loosening of the bolt 43. A bolt or bolt-like structure 45 passing through a bearing sleeve 46 within the hub 47 of a roll 48 and then passing through the hub 39 of the post 36, rotatably mounts said roll on the laterally offset lower end portion of the post.

Figure 2:
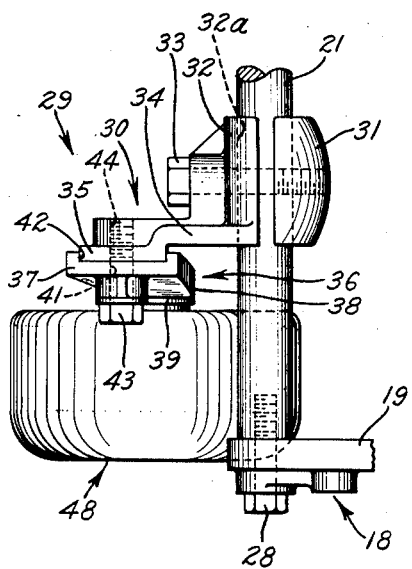
Fig. 2 is a top plan view showing the gage roll and mounting attached to a portion of the cutter unit.
Figure 3:
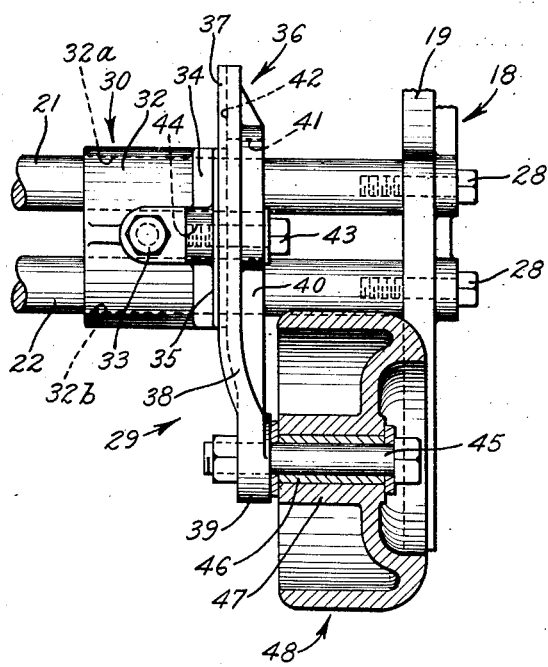
Fig. 3 is an enlarged front elevational view of the device, the view being taken as looking from the left in Fig. 2, the roll being in central vertical section.

With the present gage roll device 29 mounted as in Figs. 1, 2 and 3, the laterally curved lower end portion 38 of the post curves rearwardly or inwardly toward the cutter frame or toward the bars 21 and 22. In this location, the roll is relatively close to the cutter reel and to the stationary blade associated with the ground engaging element 26 and therefore as the roll moves upwardly over a rise in advance of the cutter it causes an upward tilting or rocking of the cutter frame and an upward tilting or rocking of the stationary blade to an extent having relation to the distance between the cutting edge of said stationary blade and the location of the roll.

As before explained, the post 36 and therefore the roll may be vertically adjusted with respect to the bracket 30. It is also noted that this bracket may be located in any desired point along the length of the bars 21 and 22, that is, it may be located adjacent a pair of ends of these bars or at their mid points or toward the other ends of the bars. Merely by loosening the bolt 33 the assembly may be slid along the bars to the desired location.

In addition to the above, the present device 39 is adapted to be reversed from the location of Figs. 1, 2 and 3 as to the position shown in Fig. 6. In this latter figure it will be noted that the bracket portion 30 has been disconnected from the bracket portion 31 and reversed so that its arm 34 is at its left side rather than at its right side, Figs. 2 and 6 being viewed from the left. Now the post 36 is mounted on the guide block 35 on the forward end of arm 34 but the post is now so located that its lower end portion 38 is offset forwardly. Therefore the roll 48 with respect to the cutter frame 18 occupies a position, in Fig. 6, somewhat in advance of the position occupied by it when mounted as in Figs. 1, 2 and 3.

The difference is represented by twice the amount of the offset of the lower end portion of the post. That is, in the first mounting, the offset carries the roll 48 inwardly toward the cutter and in the mounting in Fig. 6, the offset carries the roll outwardly from the cutter. Thus, with the mounting of Fig. 6, there is a greater distance between the roll and the stationary blade of the cutter mechanism and elevations affecting the roll, such as to move it upwardly, result in a greater upward tipping of the stationary blade when the roll is mounted as in Fig. 6 than when it is mounted as in Fig. 2. With this reverse mounting it will be understood that the bracket 30 may also be disposed in the desired location along the bars 21 and 22.

Having thus set forth the nature of my invention, what I claim is:

1. In a power lawn mower including a cutter frame comprising a pair of vertically aligned and vertically spaced horizontal front cross bars of corresponding diameters, the improvement which comprises a bracket having a pair of vertically aligned and vertically spaced horizontal crossbar engaging grooves engageable by said bars at the selected point along their length; said bracket including a forwardly extending arm, vertical guide means rigid with the forward end of said arm and located laterally of the main plane thereof, a post having vertical guide means complemental to that of the bracket, means for securing said post to said bracket in various positions of adjustment relative thereto and with the guide means of the bracket and the guide means of the post engaging, a roll, means laterally offset with respect to said vertical guide means rotatably mounting said roll on the lower end portion of said bracket, and said grooves being interchangeably engageable by said bars whereby the bracket may be reversely mounted with said guide means laterally of the selected side of the bracket arm whereby said post may be mounted on the bracket with said roll located close to or farther from said cutter frame.

2. In a power lawn mower including a cutter frame, the improvement which comprises a bracket having means for rigid attachment to said cutter frame, said bracket including a forwardly extending arm, a vertical guide block on the forward end of said arm, a post having a vertical way in a side thereof and receiving said block for guided vertical movement of the post on said block, said post having a vertically extending slot therethrough, means passing through said slot and into said block and adapted to be tightened to lock the block and post together in the desired relation of vertical adjustment as permitted by said slot, and means rotatably mounting a roll on the lower end of said post.

3. In a power lawn mower, a main frame, a ground engaging driving roll supporting said main frame, a cutter frame located forwardly of said main frame, an arm pivoted at its ends respectively to said main frame and said cutter frame and supporting the latter from said main frame, a spacing link pivoted at its ends respectively to said main frame and said cutter frame at points substantially below said pivotal connections of said arm, a ground engaging shoe carried at the underside of said cutter frame, a bracket rigidly secured to said cutter frame forwardly of said ground engaging shoe, vertical guide means carried by said bracket, a post vertically adjustable on said guide means, and a ground engaging roll rotatable on the lower end of said post.

HENRY J. STEGEMAN.

References Cited in the file of this patent

UNITED STATES PATENTS

| Number | Name | Date |
|---|---|---|
| 1,048,499 | Coldwell | Dec. 31, 1912 |
| 2,485,312 | Powell | Oct. 18, 1949 |

FOREIGN PATENTS

| Number | Country | Date |
|---|---|---|
| 12,367 | Great Britain | 1908 |